(No Model.) 3 Sheets—Sheet 1.
E. G. FISHER.
REGISTERING AND RECORDING WEIGHING SCALE.
No. 383,451. Patented May 29, 1888.
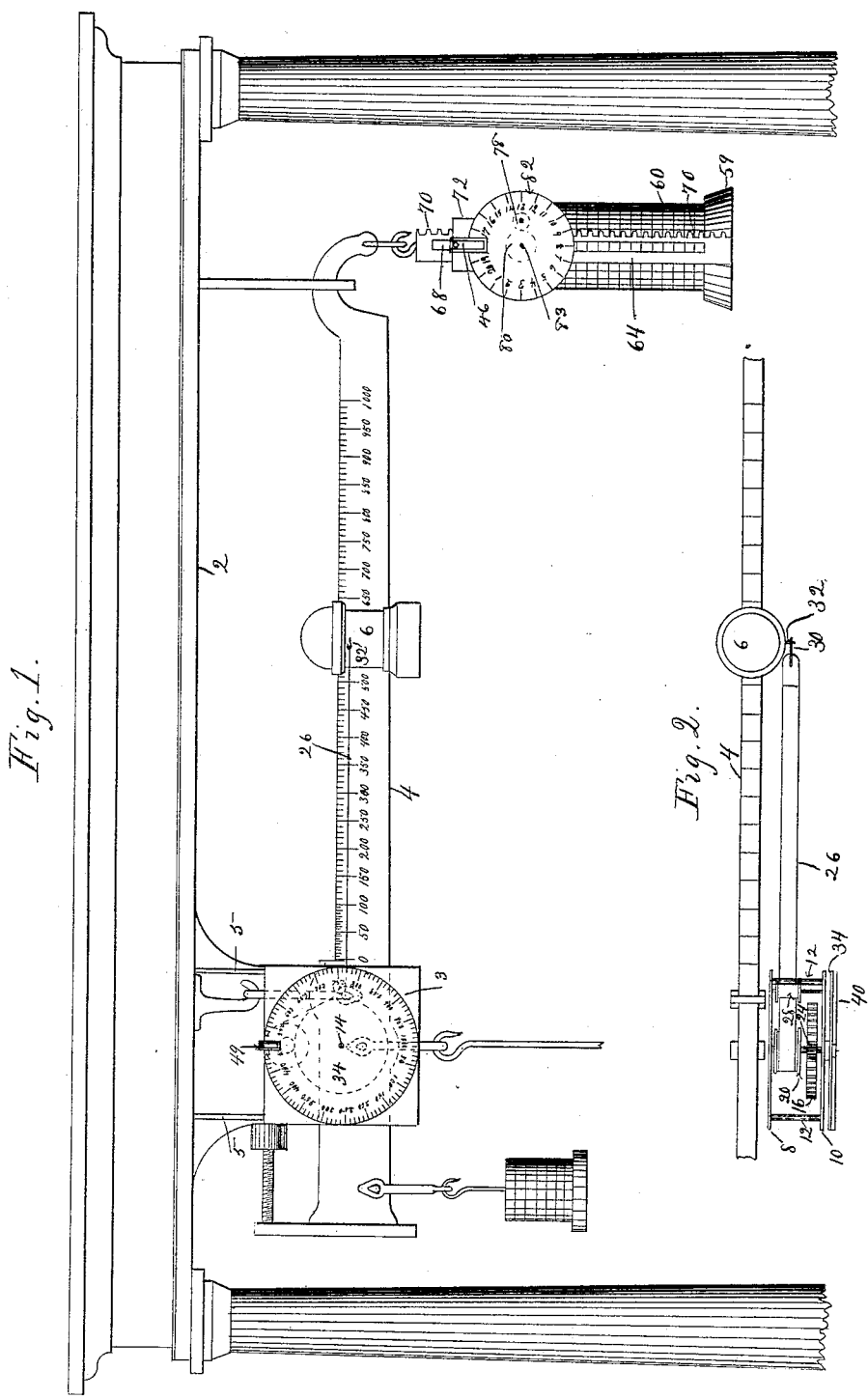
Witnesses.
S. J. Beardslee.
R. H. Sanford.
Inventor.
Edmund G. Fisher.
By A. C. Paul, atty.

(No Model.) 3 Sheets—Sheet 2.

E. G. FISHER.
REGISTERING AND RECORDING WEIGHING SCALE.

No. 383,451. Patented May 29, 1888.

Witnesses.
S. J. Beardslee.
R. H. Sanford.

Inventor.
Edmund G. Fisher
By A. C. Paul
Atty.

(No Model.) 3 Sheets—Sheet 3.
E. G. FISHER.
REGISTERING AND RECORDING WEIGHING SCALE.
No. 383,451. Patented May 29, 1888.

Witnesses.
S. J. Beardslee.
R. H. Sanford.

Inventor.
Edmund G. Fisher.

UNITED STATES PATENT OFFICE.

EDMUND G. FISHER, OF MINNEAPOLIS, MINNESOTA.

REGISTERING AND RECORDING WEIGHING-SCALE.

SPECIFICATION forming part of Letters Patent No. 383,451, dated May 29, 1888.

Application filed April 28, 1887. Serial No. 236,508. (No model.)

*To all whom it may concern:*

Be it known that I, EDMUND G. FISHER, of Minneapolis, in the county of Hennepin and State of Minnesota, have invented certain new and useful Improvements in Registering and Recording Scales, of which the following is a specification.

This invention relates to improvements in weighing-scales, and the objects I have in view are to provide a scale with means by which the weight indicated by the scale may also be shown upon a suitable registering mechanism and from which a permanent record of the weight may be made upon a suitable ticket formed of paper or other suitable material.

Other objects of the invention will appear from the following detailed description, taken in connection with the accompanying drawings, which form a part of this specification, and in which—

Figure 3:
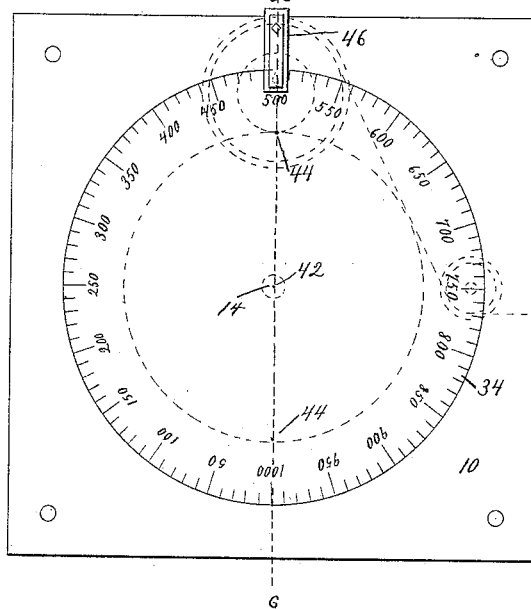
Figure 4:
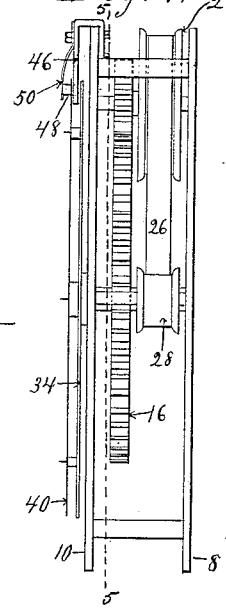
Figure 5:
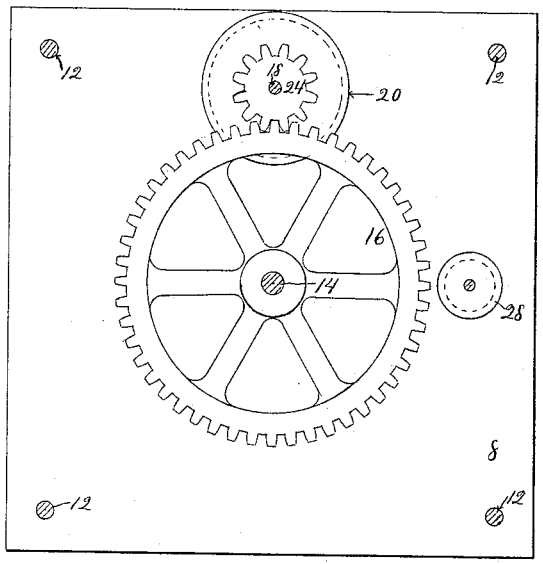
Figure 6:
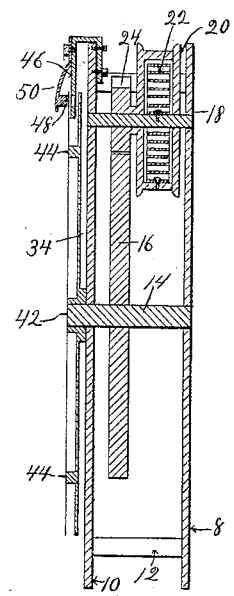
Figure 7:
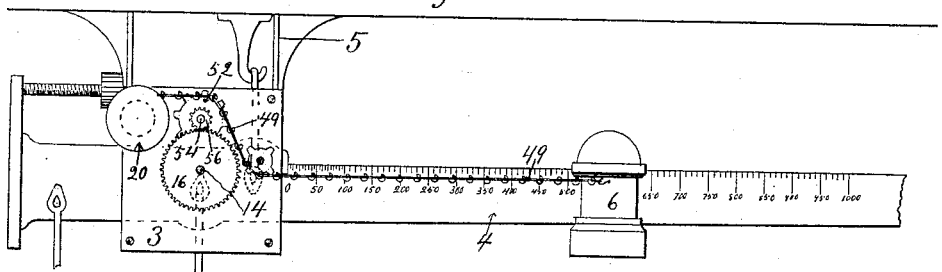
Figure 8:
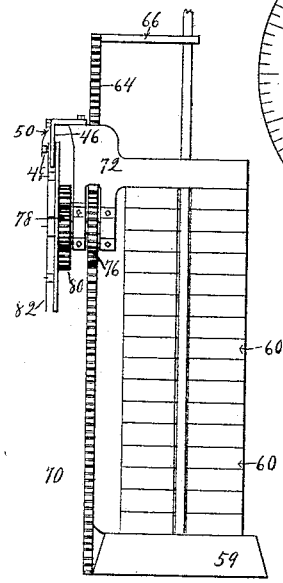
Figure 11:
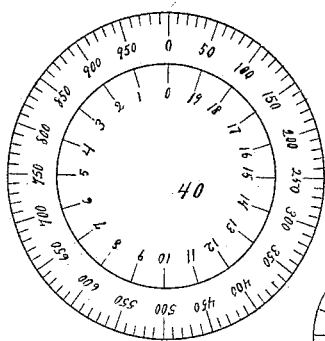
Figure 9:
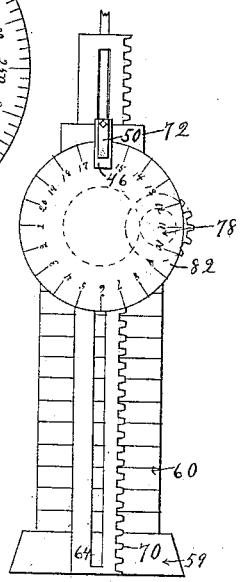

Figure 1 is a front elevation of a scale-beam and supporting-standard having my device applied thereto. Fig. 2 is a plan view of a portion of the beam and registering device. Fig. 3 is an enlarged front elevation of the registering mechanism. Fig. 4 is a side elevation of the same. Fig. 5 is a vertical section on line 5 5 of Fig. 4. Fig. 6 is a vertical section on line 6 6 of Fig. 3. Fig. 7 is a front elevation of the beam and a modified construction of registering mechanism. Fig. 8 is a side elevation, Fig. 9 a front elevation, and Fig. 10 a plan, of the counterpoise with a registering mechanism applied thereto. Fig. 11 is a detail of the recording-ticket.

The registering mechanism may be applied to any ordinary scale having a sliding poise or equivalent device for indicating weight.

In Fig. 1 of the drawings I have shown a portion of a suitable standard, 2, upon which a suitable scale-beam, 4, is supported. This scale-beam will be connected with the other parts of the scale in any preferred manner. The beam is divided and numbered in the usual way. I have shown a beam suitably divided and numbered for weighing one thousand pounds or less. Upon this beam is a suitable poise, 6, which is adapted to be moved back and forth thereon. A suitable registering mechanism, 3, is mounted upon a suitable support, 5, in proximity to the scale-beam. I prefer to secure the registering mechanism to suitable supports and locate it at or near the pivoted point of the scale-beam. This registering mechanism is provided with means for connecting it with the sliding poise, so that the weight indicated by the position of the poise upon the scale-beam will also be shown upon the registering mechanism, and thereby a second reading of the weight will be given.

I do not confine myself to any particular construction of registering mechanism, as the details thereof may be varied without departing from my invention. I have shown a simple form of registering mechanism which I may use for this purpose. This mechanism consists of a suitable base-plate, 8, and front plate, 10, connected by pins 12. In these plates a short shaft, 14, is mounted, having a suitable gear-wheel, 16, secured thereto. A hollow pulley or drum, 20, is mounted loosely upon a shaft, 18, which is mounted in the plates 8 and 10. A spring, 22, Fig. 6, has one end secured to the shaft 18 and the other end secured to the interior of the pulley 20. A pinion, 24, is secured to one side of the pulley 20 and meshes with the gear-wheel 16.

A suitable metal tape, 26, or other connecting device is secured to the pulley 20 and passes under an idler-pulley, 28, and has its end provided with a suitable link, 30, or other device by which it may be attached to the poise 6. The poise is preferably provided with a hook, 32, to which the tape may be readily attached when desired. Secured to the shaft 14 is a suitable dial, 34, having its outer circumference preferably divided into a number of spaces, which may be marked in any suitable manner and with any suitable characters or figures. I may divide the dial into a number of spaces, corresponding to the divisions on the scale-beam, and mark them to correspond with the marking of the beam. When it is not necessary to have a second reading of the weight on the registering device, a part of the marks on the dial may be omitted, it being necessary, however, to retain one or more marks in order that the ticket upon which the weight is to be recorded may be properly applied to the dial, so that a correct record of the weight as indicated by the position of the dial may be made thereon. Two of the pins 42 44 may form a sufficient marking for the dial for this purpose. It will be seen that when the tape 26 is connected to the poise the shaft 14 and dial 34 will be turned as the poise is moved away from the registering mechanism toward the other end of the beam, and the spring 22 is so arranged that it winds up the tape as the poise is moved in the opposite direction. The registering mechanism is provided with a suitable stationary pointer, which is opposite the zero-point of the dial when the poise is at zero on the scale-beam. The device which is used to punch the ticket may form a pointer to indicate the reading of the dial, and in this instance the spring 50, carrying the punch 48, serves also as the stationary pointer, though, of course, any other suitable pointer may be used instead. The registering mechanism will therefore indicate the weight shown by the position of the poise on the scale-beam.

For the purpose of recording the weight indicated by the registering mechanism I provide a suitable ticket that is preferably formed of paper or other suitable material and preferably of the size and shape of the registering dial. This ticket may be divided and marked in any suitable manner. I have shown in Fig. 11 a ticket, 40, having its divisions corresponding to the divisions of the registering-dial. The dial is preferably provided with a sharp stud or pin, 42, at its center and one or more similar pins, 44, near its edge. The ticket upon which the record is to be made is placed over the dial with its center coinciding with the center of the dial and its zero-point coinciding with the zero-point of the dial. I then form an impression in the ticket or puncture it at a point opposite the stationary pointer of the registering mechanism. Any suitable means may be used for impressing or puncturing the ticket. I have shown a preferable means for this purpose, consisting of a plate, 46, extending over the face of the dial, so that it comes directly under the ticket when it is in position upon the dial. This plate has an opening through it, over which is arranged a suitable punch or cutter, 48, carried by a spring-plate, 50, that holds it normally away from the surface of the ticket.

After the ticket has been placed upon the dial and the poise moved to the proper position on the scale-beam, which may be done either before or after the ticket is put in place, the spring-plate 50 is pushed in and a hole is made in the ticket by the punch. A permanent record of the weight will thereby be formed upon the ticket. Two or more tickets may be placed upon the dial at once and all punched at the same time.

A suitable chain or cord may be used in place of the tape 26, and a suitable weight might be used as the equivalent of the spring for winding the tape upon its pulley.

It will be noticed that as the tape is unwound from the pulley or drum by moving the poise away from the registering device the diameter of the roll becomes less as each layer of the tape is removed, and that therefore the movement of the dial will gradually decrease as the poise is moved farther along the scale-beam. It will be desirable in most instances, therefore, to form the dial with gradually-decreasing spaces when it is to be operated by the mechanism shown in Figs. 1 to 6. I may, however, arrange the dial so that, instead of being operated by the shaft directly from the tape-drum, it will be operated by an independent shaft that is engaged by the tape or other connecting device at a point between the spring-drum and the poise. This modification I have illustrated in Fig. 7. In place of the tape I have here shown a sprocket-chain, 49, that is wound upon a drum or pulley, 20, as in the other construction, and thence passes over a sprocket-wheel, 52, on a shaft, 54. This shaft has also secured to it a pinion, 56, that meshes with the gear-wheel 16. With this construction it will be seen that the dial is always moved the same distances for corresponding movements of the poise, as the drum upon which the chain is wound is not connected with the registering device.

Instead of using a movable dial and stationary pointer, I may employ as an equivalent construction therefor a movable pointer and a stationary dial.

Figure 10:
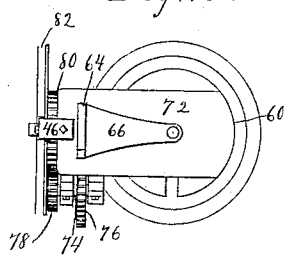

The scale-beam which I have shown in Fig. 1 is provided with a counterpoise, 59, and a series of weights, 60, that may be applied thereto in the usual way. These weights when used will generally indicate hundreds or thousands of pounds, while the fractions thereof are shown upon the beam, as well understood in the use of scales of this kind. I provide a registering device by which the number of weights that are suspended from the beam or the number of pounds indicated by those weights will be shown, and from this registering device a permanent record of its reading may be made upon the same ticket that is used for recording the weight indicated by the position of the poise on the beam. The construction of the registering mechanism that I prefer to use is as follows: A standard, 64, is secured to the bottom plate of the counterpoise, and a rack-bar, 70, is formed upon the edge of this standard. A plate, 66, Fig. 10, is preferably secured to the upper end of the standard and has a hole in it, through which the suspending-rod of the counterpoise passes. A follower, 72, is arranged upon the standard 64 and extends over the counterpoise and rests upon the top of the upper weight on the counterpoise. Mounted in suitable bearings on this follower is a short shaft, 74, Fig. 10, carrying a pinion, 76, that meshes with the rack 70. Another pinion, 78, is carried by the shaft 74, and this pinion meshes with another pinion, 80, upon a short shaft, 83, carrying the dial 82. A stationary plate or pointer, 46, is secured to the follower and extends over the dial in the manner already described for the other registering device. Suitable means are also provided for puncturing the ticket that is used in making a record of the reading of this registering device. I have shown a punch, 48, carried by a spring-plate, 50, similar to that shown in Figs. 3, 4, and 5. The dial 82 is divided, preferably, into the same number of spaces that there are weights for the counterpoise. In the present instance I have shown the dial divided into twenty spaces, that are numbered 1 to 20, and a counterpoise that is adapted to have twenty weights applied thereto. The reading of the registering device shows the number of weights on the counterpoise. In this instance, as in that of the registering mechanism operated by the poise, it is not necessary to provide a dial with all of the marks needed to show the reading of the weight. It must be provided with one or more marks to show how the ticket is to be applied to the dial, and then the figures on the ticket itself will show the reading of the registering mechanism. The reading of this registering device, together with that of the registering device connected with the sliding poise, will give the total of the weight on the scale. I may form a record of both of these readings upon one ticket, 40, having an inner scale corresponding to the dial of the counterpoise registering device and an outer scale corresponding to the dial of the registering device that is connected with the counterpoise.

It is not essential that the spaces on the tickets correspond to those on the dials. For instance, the dial may be spaced and marked to indicate pounds, and the tickets that are used with it may be spaced and marked to indicate bushels. A ticket of this kind being placed over a dial indicating pounds, the weight will be reduced to bushels and fractions thereof, or to bushels and pounds, or, in other words, the weight on the scale will be shown on the registering device in pounds, but will be recorded on the ticket in bushels.

It will be understood that the registering device may, if preferred, be provided with a movable pointer and stationary dial, and that the details of construction thereof may be otherwise varied without departing from my invention.

In my former patent, No. 371,831, granted October 18, 1887, I have described and claimed a registering and recording mechanism mounted on the sliding poise. In the present instance the registering and recording device is mounted upon an independent support, and the poise need be connected with this mechanism only when it is desired to make a record of the weight. The poise may first be moved to the proper position on the scale-beam, and the tape or chain may then be drawn out and connected with the poise. I do not wish to be confined, however, to the means herein shown for operating the dial that is connected with the poise, as it will be seen that for the purposes of the invention herein claimed I may use a registering device that is mounted upon the sliding poise in place of one that is mounted upon an independent support and connected with the poise.

It will be seen that this device is so constructed and arranged that it may be easily applied to an ordinary scale without making any changes in the scale itself or its beam or poise.

I claim as my invention—

1. The combination, with a scale-beam having a sliding poise and a suspended counterpoise, of a registering mechanism connected with said sliding poise, whereby the weight indicated by said poise is also indicated on said registering mechanism, a sliding follower on said counterpoise, and a registering mechanism connected with said follower, whereby the weights on said counterpoise are indicated upon said registering mechanism, substantially as described.

2. The combination, with a scale-beam having a sliding poise and a suspended counterpoise, of a registering mechanism connected with said sliding poise, whereby the weight is indicated on said registering mechanism, a sliding follower on said counterpoise, a registering mechanism connected with said follower, whereby the weights on said counterpoise are indicated on said registering mechanism, a recording-ticket, and means for forming on said ticket a record of the readings of said registering mechanisms, substantially as described.

3. The combination, with the scale-beam and the suspended counterpoise having the removable weights 60, of the follower 72, arranged to rest on the upper weight, and a registering mechanism connected with and operated by the movement of said follower, substantially as described.

4. The combination, with the scale-beam and the suspended counterpoise having the removable weights 60, of the follower resting on the upper of said weights 60, a registering mechanism connected with said follower, a recording-ticket, and means for forming on said ticket a record of the reading of said registering mechanism, substantially as described.

5. The combination, with the scale-beam, of the suspended counterpoise having the removable weights 60, the standard 64, having the rack 70, the follower 72, adapted to rest on said weights, and the registering mechanism carried by said follower and provided with a gear-wheel engaging said rack 70, substantially as described.

In testimony whereof I have hereunto set my hand this 11th day of April, 1887.

EDMUND G. FISHER.

In presence of—
A. C. PAUL,
R. H. SANFORD.